Patented July 16, 1940

2,207,859

UNITED STATES PATENT OFFICE 2,207,859

METALLIFEROUS AZO DYESTUFFS

Joseph Gyr, Basel, Switzerland, assignor to Society of Chemical Industry in Basle, Basel, Switzerland No Drawing. Application March 31, 1938, Serial No. 199,277. In Switzerland April 3, 1937

4 Claims. (Cl. 260—145)

This invention relates to the manufacture of metalliferous poly-azo dyestuffs of the formula

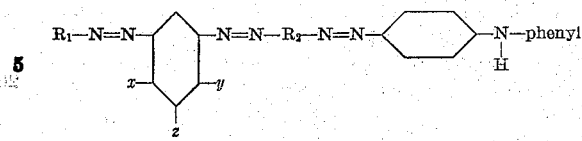

in which $x$ and $y$ stand for a member of the group consisting of OH and $NH_2$, $z$ stands for a member of the group consisting of H and $-N=N-R_3$, $R_3$ standing for an aromatic isocyclic nucleus consisting of at least 6 and at the most 10 carbon atoms, $R_1$ stands for an aromatic isocyclic nucleus consisting of at least 6 and at the most 10 carbon atoms and containing in ortho-position to the $-N=N-$group a hydroxyl group, $R_2$ stands for an aromatic isocyclic nucleus consisting of at least 6 and at the most 10 carbon atoms, and in which one of the aryl radicals linked to the NH-group carries at least one sulfo group, by coupling 1 mol of a meta-dihydroxy- or meta-aminohydroxy- or meta-diamino-compound of the benzene series which is capable of coupling at least twice, in any order with a diazo-compound containing at least one lake-forming group and with a diazo-azo-compound obtainable by coupling a diazotized aminodiphenylamine sulfonic acid with any desired middle component and further diazotizing, then coupling the dyestuffs thus obtained, if desired with a further diazo-compound and treating the products at any desired phase of the process with a metal compound.

For constructing the azo dyestuffs of the foregoing general formula, whose metal compounds, preferably copper compounds, are to be made or used by the present invention, there come into question as aromatic amines ($R_1$) containing lake-forming groups amines of the benzene and naphthalene series, wherein there is a hydroxyl group in ortho-position to the amino group; such amines are, for example, ortho-aminophenols, ortho-aminonaphthols, amino-salicylic acids, as well as the sulfonic acids, nitro, alkyl and halogen substitution products of these bodies. As parent materials for the residues

there may be used, for example, 1:3-dihydroxybenzene, 1:3-diaminobenzene, 1-amino-3-hydroxybenzene, as well as their substitution products insofar as these are capable of coupling at least twice. As parent materials for the residue $R_2$ there come into question so-called middle components, such as 1-aminobenzene, 1-amino-2-methylbenzene, 1-amino-2-methoxybenzene (in the form of their ω-methane-sulfonic acid), 1-amino-3-methylbenzene, 1-amino-2:5-dimethylbenzene, 1-amino-2-methoxy- or -ethoxy-5-methylbenzene, 1-amino-2:5-dimethoxy- or diethoxybenzene, 1 - amino-3-acetylaminobenzene, 1-aminonaphthalene, 1-amino-2-methoxy- or -ethoxynaphthalene and their 6- or 7-sulfonic a c i d s, 2-amino-5-hydroxynaphthalene-7-sulfonic acid, 2-amino-8-hydroxynaphthalene-6-sulfonic acid or the like and as parent materials for the residue

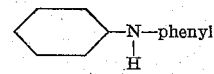

4-amino-4'-nitrodyphenylamine-2'-sulfonic acid, 4-amino-2'-nitrodiphenylamine-4'-sulfonic acid, 4-amino-2':6'-dinitrodiphenylamine-4'-sulfonic acid, 4-amino-3-ethoxy- or -methyl-4'-nitrodiphenylamine-2'-sulfonic acid, 4-amino-2':4'-dinitrodiphenylamine-3-sulfonic acid, 4-aminodiphenylamine-2-sulfonic acid, 4-amino-4'-methyl- or -4'-methoxy-diphenylamine-2-sulfonic acid or the like. As parent material for the residue $z$ insofar as it is not hydrogen, any diazo or diazo-azo-compound may be used.

The azo dyestuffs of the foregoing general formula may be produced by the action of the diazo-compound on the coupling components in any order and according to the selected order as well as the nature of the diazo compounds, the coupling may occur in neutral, acid or alkaline medium, for example in a solution containing sodium carbonate, bicarbonate, alkaline earth, caustic alkali, ammonia, pyridine, acetic acid or hydrochloric acid. The dyestuff produced may be treated with various agents yielding metal, especially copper, for introducing metal; suitable agents are copper sulfate, copper chloride, tetramine-cupric sulfate, copper acetate, any of which may be used, if desired, in the presence of an organic base, for instance pyridine. The agent yielding copper may be caused to act either on the mono-azo dyestuff containing the lake-forming groups or on the finished dis- or polyazo dyestuff; furthermore, the treatment with copper may be applied in the dyebath or simultaneously with the production of the dyestuff. As other suitable metals there may be named chromium, iron, nickel and cobalt, which also may be introduced into the dyestuff molecule by known methods.

The metalliferous azo dyestuffs obtainable by this invention are excellent dyestuffs for leather and dye leather tanned in any manner uniform brown to black-brown tints. These dyeings are very fast to acids and alkalis and of excellent fastness to light. They are characterized by a good penetration.

The following examples illustrate the invention, the parts being by weight:

Example 1

18.9 parts of 2-aminophenol-4-sulfonic acid are diazotized. The diazo-compound is coupled in alkaline medium with a solution of 11 parts of 1:3-dihydroxybenzene, the precipitated dyestuff is dissolved and converted into the complex copper compound by boiling with a solution of 25 parts of crystallized copper sulfate. The separated copper compound is dissolved again by means of excess of sodium carbonate and coupled with the diazo-azo-compound obtainable by coupling the diazo-compound from 30.9 parts of 4'-nitro-4-aminodiphenylamine-2'-sulfonic acid in presence of sodium acetate with a solution of 13.7 parts of 1-methyl-3-amino-4-methoxybenzene and diazotizing the mono-azo dyestuff thus formed. When the formation of dyestuff is complete, the whole is heated to 70° C. and the dyestuff which represents the copper compound of the product of the formula

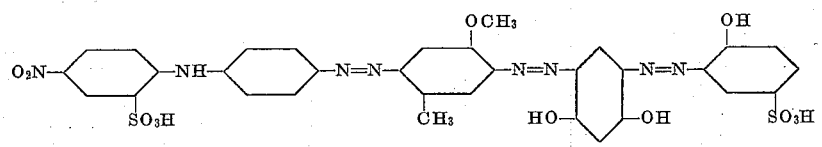

salted out with sodium chloride. It dyes chrome leather and vegetable tanned leather deep brown tints. Nickel and iron compounds produce also brown tints on chrome leather.

If in this example instead of the 4'-nitro-4-aminodiphenylamine-2'-sulfonic acid there is used the same quantity of 2'-nitro-4-aminodiphenylamine-4'-sulfonic acid, the dyestuff obtained which represents the copper compound of the product of the formula

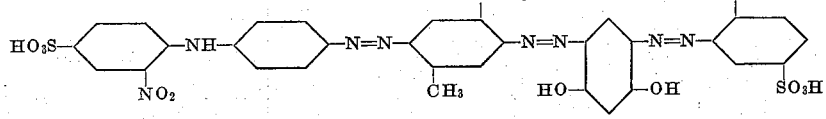

dyes chrome leather or vegetable tanned leather tints of a somewhat more violet strain.

Example 2

One of the trisazo dyestuffs obtainable as described in Example 1 is coupled in solution alkaline with sodium carbonate with the diazo-compound obtained by diazotizing 13.8 parts of 4-nitro-1-aminobenzene. When the formation of dyestuff is complete, the dyestuff which corresponds to the copper compound of the product of the formula

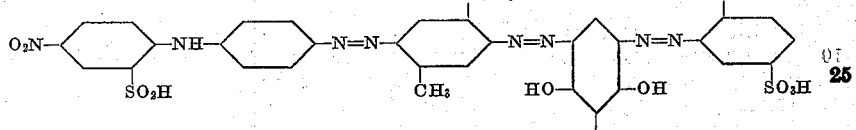

is salted out in usual manner with common salt. It dyes chrome leather and vegetable tanned leather somewhat more yellowish tints than are produced by the dyestuff of Example 1.

A similar dyestuff is produced when the diazo-compound from 13.8 parts of 4-nitro-1-aminobenzene is exchanged for that from 22.3 parts of 1-aminonaphthalene-4- or -5-sulfonic acid.

Further diazotizing components which may be used instead of the foregoing are, for example, those from 4-chloro-1-aminobenzene, 3-nitro-1-aminobenzene, 1-aminobenzene-4-sulfonic acid, 1-amino-2-methyl-4-chlorobenzene, 4'-nitro-4-aminodiphenylamine-2'-sulfonic acid; similar products are obtained. Such dyestuffs are for example the copper, iron or nickel compounds of the dyestuffs of the formulas

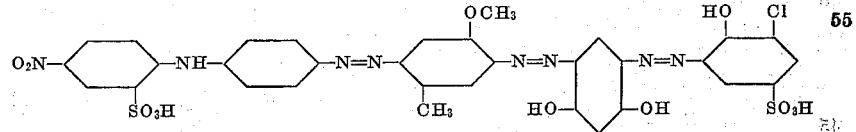

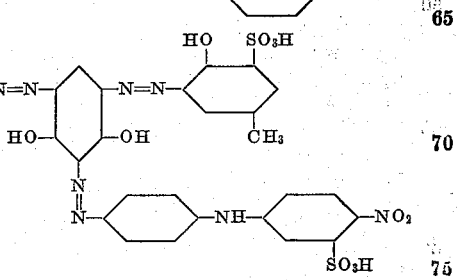

Example 3

The complex copper compound obtained as described in Example 1 from 18.9 parts of 2-aminophenol-4-sulfonic acid and 11 parts of 1:3-dihydroxybenzene is dissolved in an excess of sodium carbonate solution. The solution is coupled with the diazo-azo-compound obtainable by coupling the diazo-compound from 30.9 parts of 4'-nitro-4-aminodiphenylamine-2'-sulfonic acid in presence of sodium acetate with a solution of 22.3 parts of 1-aminonaphthalene-6- or -7-sulfonic acid and further diazotizing the monoazo dyestuff thus formed. When the formation of dyestuff is complete, the whole is heated to 70° C. and the dyestuff salted out by sodium chloride. The dyestuff which represents the copper compound of the product of the formula

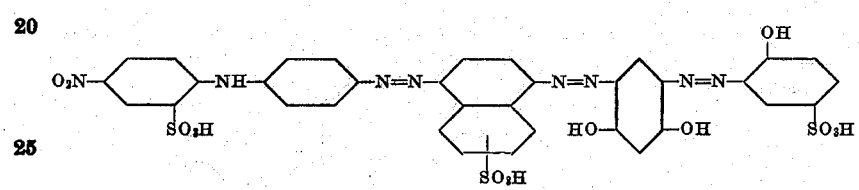

dyes chrome leather and vegetable tanned leather deep brown tints. Iron and nickel compounds of this dyestuff dye similar tints.

If in this example instead of the 4-nitro-4-aminodiphenylamine-2'-sulfonic acid there is used the same weight of 2'-nitro-4-aminodiphenylamine-4'-sulfonic acid, the dyestuff obtained dyes chrome leather or vegetable tanned leather tints of a somewhat more violet strain, whereas the copper compound of the dyestuff from the 4'-methyl-4-aminodiphenylamine-2-sulfonic acid of the formula

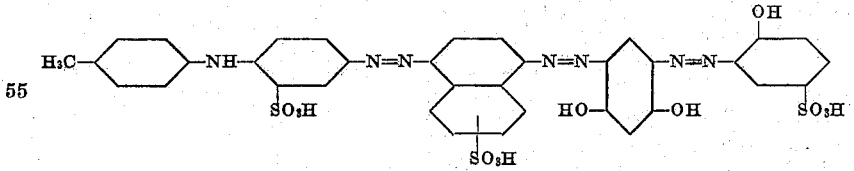

dyes dark violet brown tints.

Somewhat redder dyestuffs are produced if in the production of the monoazo dyestuff which is used as the parent material for making the trisazo dyestuffs of the first and second paragraphs of this example there are used 23.4 parts of 2-amino-4-nitro-1-hydroxybenzene-6-sulfonic acid instead of the 18.9 parts of 2-aminophenol-4-sulfonic acid.

The formula of such a dyestuff is for example the formula

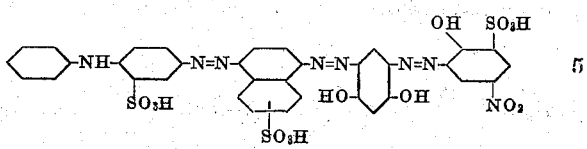

Example 4

The copper compound obtained as described in Example 1 from 18.9 parts of 2-amino-1-hydroxybenzene-4-sulfonic acid and 11 parts of 1:3-dihydroxybenzene is dissolved in excess of sodium carbonate solution. The solution is coupled with the diazo-azo-compound obtainable by coupling the diazo-compound from 30.9 parts of 4'-nitro-4-aminodiphenylamine-2'-sulfonic acid in presence of sodium acetate with a solution of 14.3 parts of 1-aminonaphthalene and further diazotizing the monoazo dyestuff thus obtained. When the formation of dyestuff is complete, the whole is heated to 70° C. and the dyestuff which represents the copper compound of the product of the formula

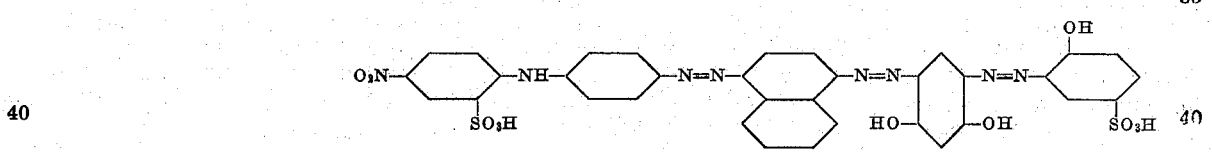

precipitated by addition of sodium chloride. It dyes chrome leather and vegetable tanned leather reddish brown tints.

Also in this example the 4'-nitro-4-aminodiphenylamine-2'-sulfonic acid can be replaced by an unnitrated compound or the 4'-CH₃-compound. Such a dyestuff is for example the copper, iron, nickel or cobalt compound of the product of the formula

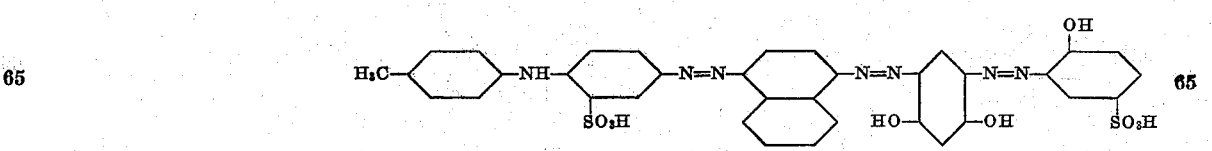

Example 5

One of the trisazo dyestuffs obtainable as described in Example 3 or 4 is coupled in solution alkaline with sodium carbonate with the diazo-compound obtainable by diazotizing 13.8 parts of 4-nitro-1-aminobenzene. When the formation of dyestuff is complete, the dyestuff is salted out with sodium carbonate; it represents the copper compound of the product of the formula

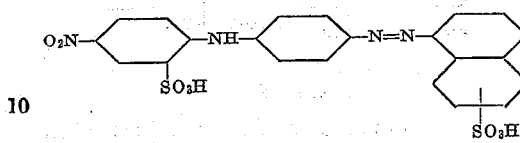

and dyes chrome leather and vegetable tanned leather somewhat more yellowish tints than those obtained with the dyestuffs of Example 3 or 4. Here also further similar dyestuffs can be made by using the diazotizing components mentioned in the second paragraph of Example 2.

Example 6

The dyestuff obtained by coupling the diazo compound from 23.9 parts of 1-amino-2-hydroxy-naphthalene-4-sulfonic acid with 11 parts of 1:3-dihydroxybenzene in caustic alkaline solution is precipitated by acidifying, re-dissolved in an excess of sodium carbonate solution and coupled with the diazo-azo-compound obtainable by coupling the diazo-compound from 30.9 parts of 4'-nitro-4-amino-diphenylamine-2'-sulfonic acid in presence of sodium acetate with a solution of 22.3 parts of 1-aminonaphthalene-6- (or -7) -sulfonic acid and further diazotizing the monoazo dyestuff thus formed. When the formation of dyestuff is complete the dyestuff is salted out by sodium chloride, re-dissolved in hot water, acidified with little acetic acid and boiled for some time after addition of a solution of 25 parts of crystallized copper sulfate. The dyestuff is salted out with sodium chloride. It represents the complex copper compound of the product of the formula

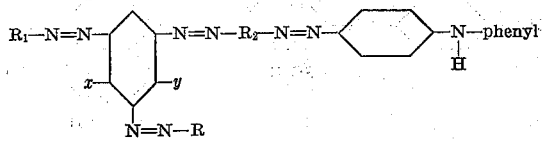

and dyes chrome leather and vegetable tanned leather deep brown tints.

A dyestuff having similar properties is obtained if the dyestuff is coupled, previous to its conversion into the copper compound, with the diazo compound from 13.8 parts of 4-nitro-1-aminobenzene in the presence of sodium carbonate and converted only subsequently in the indicated manner into the copper compound of the product of the formula

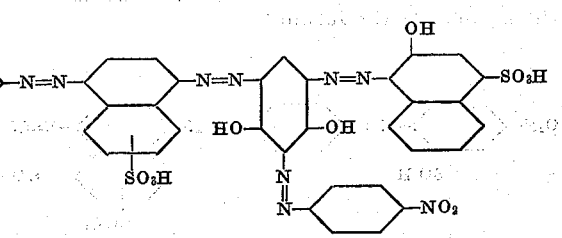

Example 7

Neutralized chrome leather (box calf, chrome sides, glazed kid, full chrome sheep) is tumbled in a cask with 3–4 times its weight of water at 60° C. During the rotation, there is fed through the hollow axle a solution of the cupriferous dyestuff obtained as described in Example 1. After about 40 minutes the dyestuff is absorbed by the leather, whereupon the latter is stuffed as usual.

The leather dyed in this manner has a very full dark brown tint which is very fast.

Example 8

Well fulled vegetable tanned sheep or goats leather is dyed neutral as described in Example 7. When the dyeing is complete, there is added formic acid amounting to half the weight of the dyestuff used and dyeing is continued for 10–15 minutes; rinsing follows.

The dyed leather is deep fast brown.

Dyeing may also be conducted in a neutral cold liquor by the brushing process.

What I claim is:

1. Cupriferous azo dyestuffs of the formula

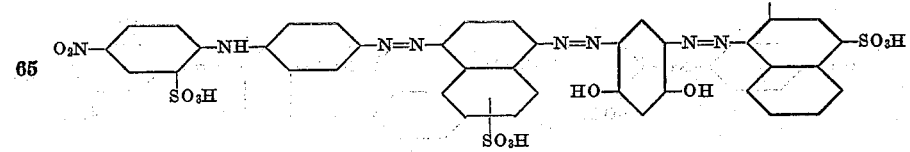

in which $x$ and $y$ stand for a member of the group consisting of OH and $NH_2$, R stands for an aryl radical of the group consisting of phenyl and naphthyl radicals, $R_1$ stands for an aryl radical of the group consisting of phenyl and naphthyl radicals and containing an hydroxyl group in ortho position to the —N=N-group, and R₂ stands for an aryl radical of the group consisting of phenyl and naphthyl radicals, one of the aryl radicals linked to the $$-\underset{H}{N}\text{-group}$$

carrying at least one sulfo group.

2. The complex copper compound of the azo dyestuff of the formula

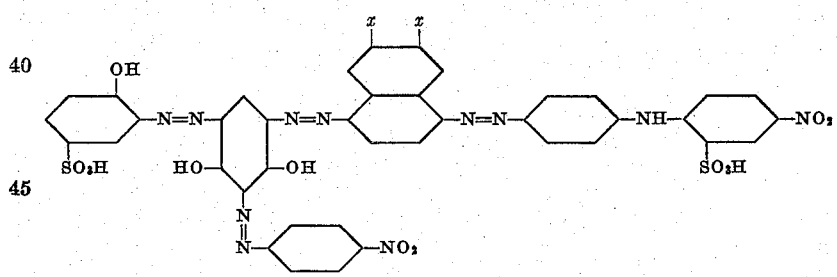

in which one $x$ stands for H and the other $x$ for SO₃H.

3. The complex copper compound of the azo dyestuff of the formula

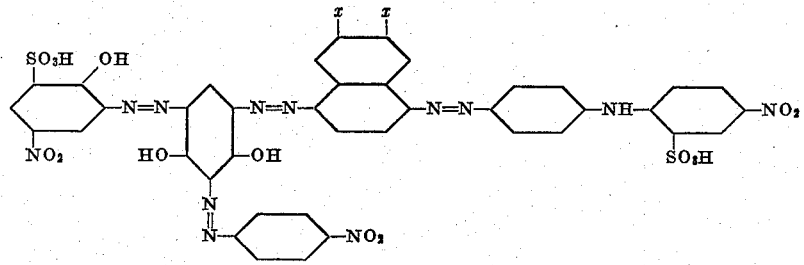

in which one $x$ stands for H and the other $x$ for SO₃H.

4. The complex copper compound of the azo dyestuff of the formula

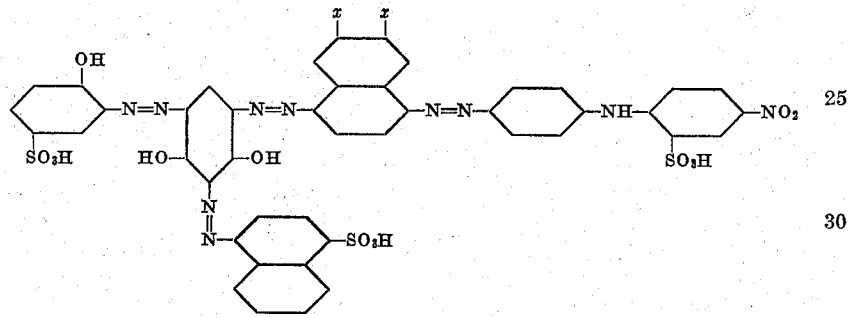

in which one $x$ stands for H and the other $x$ for SO₃H.

JOSEPH GYR.